(12) United States Patent
Fink et al.

(10) Patent No.: US 12,531,356 B2
(45) Date of Patent: Jan. 20, 2026

(54) BASE ELEMENT FOR AN AT LEAST TWO-PART OVERVOLTAGE PROTECTOR AND CORRESPONDING OVERVOLTAGE PROTECTOR

(71) Applicant: Phoenix Contact GmbH & Co. KG, Blomberg (DE)

(72) Inventors: Jean-Michel Fink, Paderborn (DE); Moritz Krink, Detmold (DE); Heinz Reibke, Bad Salzuflen (DE); Gerhard Wolff, Extertal (DE); Ralph Hoppmann, Bad Oeynhausen (DE); Martin Gebhardt, Porta Westfalica (DE)

(73) Assignee: Phoenix Contact GmbH & Co. KG, Blomberg (DE)

(*) Notice: Subject to any disclaimer, the term of this patent is extended or adjusted under 35 U.S.C. 154(b) by 461 days.

(21) Appl. No.: 17/637,636

(22) PCT Filed: Jul. 14, 2020

(86) PCT No.: PCT/EP2020/069833
§ 371 (c)(1),
(2) Date: Feb. 23, 2022

(87) PCT Pub. No.: WO2021/037434
PCT Pub. Date: Mar. 4, 2021

(65) Prior Publication Data
US 2022/0271451 A1 Aug. 25, 2022

(30) Foreign Application Priority Data
Aug. 26, 2019 (DE) .................... 10 2019 122 824.7

(51) Int. Cl.
*H01R 9/26* (2006.01)
*H01R 13/502* (2006.01)
*H01R 25/14* (2006.01)

(52) U.S. Cl.
CPC ......... *H01R 9/2641* (2013.01); *H01R 13/502* (2013.01); *H01R 25/14* (2013.01)

(58) Field of Classification Search
CPC .. H02H 9/06; H02H 9/00; H02H 9/04; H02H 9/044; H02H 9/045; H02B 1/052;
(Continued)

(56) References Cited

U.S. PATENT DOCUMENTS 6,120,317 A * 9/2000 Miquet ................ H01R 4/2433
439/417
8,908,346 B2 12/2014 Birkholz et al.
(Continued)

*Primary Examiner* — Danny Nguyen
(74) *Attorney, Agent, or Firm* — Calderon Safran & Wright P.C.; David S. Safran

(57) ABSTRACT

A base element for an at least two-part overvoltage protective arrangement, has a support rail receptacle for receiving a support rail carrying an electrical potential, a first receptacle for receiving a first electrical conductor, a second receptacle for receiving a second electrical conductor, and a protective element receptacle for receiving an overvoltage protective element. An electrical connecting element for transmitting an electrical signal from the first receptacle to the second receptacle is produced between the first second receptacles. An electrical support rail contact element makes electrical contact with the support rail when the support rail is received by the support rail receptacle. The first and second receptacles receive electrical connector parts or adapter connector parts for electrical connector parts. An overvoltage protective arrangement with such a base element. The base element and overvoltage protective arrangement make possible simple installation in existing control and signaling systems with minimal intervention.

13 Claims, 7 Drawing Sheets

(58) Field of Classification Search
CPC .... H01R 9/2641; H01R 13/502; H01R 25/14; H01R 13/40; H01R 24/00; H01T 4/06
USPC .................................................. 361/117–120
See application file for complete search history.

(56) References Cited

U.S. PATENT DOCUMENTS

| | | |
|---|---|---|
| 9,411,614 B2 | 8/2016 | Kretschmann et al. |
| 10,062,978 B2 | 8/2018 | Henke et al. |
| 10,468,871 B2 | 11/2019 | Barcey et al. |
| 2015/0349523 A1* | 12/2015 | Tsovilis .................... H01T 1/16 361/56 |
| 2016/0126728 A1* | 5/2016 | Kawabata ................ H01C 7/12 361/56 |
| 2017/0338649 A1* | 11/2017 | Barcey .................... H02H 9/045 |

* cited by examiner

BASE ELEMENT FOR AN AT LEAST TWO-PART OVERVOLTAGE PROTECTOR AND CORRESPONDING OVERVOLTAGE PROTECTOR

BACKGROUND OF THE INVENTION

Field of the Invention

The invention relates to a base element for an at least two-part overvoltage protector, with a support rail receptacle for receiving a support rail carrying an electrical potential, with a first receptacle for receiving a first electrical conductor, with a second receptacle for receiving a second electrical conductor, and with a protective element receptacle for receiving an overvoltage protective element. Moreover, the invention also relates to an overvoltage protective arrangement, with at least one base element and with at least one overvoltage protective element, wherein the base element has a support rail receptacle for receiving a support rail carrying an electrical potential, a first receptacle for receiving a first electrical conductor, a second receptacle for receiving a second electrical conductor, and a protective element receptacle for receiving the overvoltage protective element.

BACKGROUND OF THE INVENTION

The above-mentioned base elements of overvoltage protectors and the corresponding overvoltage protectors have been known for many years; they serve to protect electronic devices and electrical installations from overvoltage. Overvoltage protectors can be designed for various applications; in this case, a distinction is often made between overvoltage protectors for protecting voltage supply systems and overvoltage protectors for protecting signal lines or extra-low-voltage lines.

Description of the Related Art

From the state of the art, it is also known that multiple first conductors can also be received by the base element via multiple first receptacles, and multiple second conductors can also be received just as well from the base element via multiple second receptacles. Regardless of the number of the first conductors and the number of the second conductors, in any case an electrical connecting element for transmitting an electrical signal (in the form of an electrical voltage) from the first receptacle to the second receptacle is produced between the first receptacle and the second receptacle.

Here, those overvoltage protectors and corresponding base elements for such overvoltage protectors are taken into consideration, in which in the support rail receptacle, an electrical support rail contact element is designed for making electrical contact with the support rail when the support rail is received by the support rail receptacle. Support rails are usually configured as metal profile rails, often as so-called "cap rails." When the support rails are charged with an electrical potential, then in most cases, this is the ground potential of the electrical unit. This electrical potential of the support rail is also frequently used to implement the overvoltage protection as insulation protection between signal conductors and grounds.

For this purpose, the overvoltage protective element includes the electrical protective means that are necessary for overvoltage protection. When the overvoltage protective element is received in the protective element receptacle, the electrical connecting element and the electrical support rail contact element make electrical contact at least indirectly by means of corresponding electrical contact elements of the overvoltage protective element. To limit the overvoltage and discharge of the surge currents, a low-impedance electrical connection between the electrical contact elements is made in the overvoltage protective element in the case of an overvoltage that occurs between the electrical contact elements of the overvoltage protective element.

In control and signaling systems, multipolar system cables or system lines are frequently used, over which a number of different signals are carried. It is easy to see that the feeding of individual signal conductors to corresponding overvoltage protectors and to the base elements of these overvoltage protectors is expensive and also error-prone. For multipolar system cables, multipolar plug-in connector systems are often also available for separating and connecting the multipolar cables, wherein the connector parts interlock in a positive manner. There are applications—this relates to existing plants in many cases—in which operating means that are complementary as retrofits, such as, for example, the overvoltage protectors in question here, are to be introduced into one or more signal paths. Depending on the application, in this case, i.e., there is no change to existing wiring for formal licensing or safety reasons. If, for example, lightning-protection systems are to be installed to protect the insulation of the existing systems, then the existing cable routing must be preserved as much as possible. No cable connections should be opened or completely detached and later reconnected in another form. Only minimal interventions should be performed, in order to keep from jeopardizing existing licensing of the electrical units.

SUMMARY OF THE INVENTION

For this invention, the type of voltage(s) to be transferred by the overvoltage protector is not the important factor. The electrical voltage to be transferred by the overvoltage protector and/or the electrical current to be transferred and/or the electrical power to be transferred are fed via the first receptacle for receiving the first electrical conductor in the overvoltage protector, i.e., from the unsecured side, and are discharged via the second receptacle for receiving the second electrical conductor from the overvoltage protector, i.e., into the side secured against overvoltage. The term of electrical conductor is broadly defined here. It is known from the state of the art that the first electrical conductor and the second electrical conductor are in each case the end of a metal wire that is insulated or is stripped in places. In the first receptacle and in the second receptacle, for example, spring clamps or insulation displacement terminations—i.e., as components of the base element—are then provided, with which the inserted end of the metal wire is held and brought into electrical contact.

The object of this invention is therefore to indicate a base element for overvoltage protectors and also corresponding overvoltage protective arrangements, which make possible simple installation, in particular, in existing control and signaling systems.

The previously indicated object is first achieved in the base element described in the beginning in that the first receptacle and the second receptacle are designed for receiving electrical connector parts or adapter connector parts for electrical connectors. These electrical connector parts are the parts of an often multipolar, electrical connector, wherein the connector parts then interlock in a positive manner. The first receptacle and the second receptacle can also be designed for receiving connector parts from various connectors; this does not necessarily have to mean the receiving of corresponding connector parts.

In a preferred configuration, however, it is provided that the first receptacle and the second receptacle are designed for receiving corresponding electrical connector parts, i.e., that interlock in a positive manner, wherein these electrical connector parts of course have plug-in contacts, via which an electrical connection can then be produced. The corresponding connector parts are usually corresponding male/female electrical connector parts.

In the first receptacles and second receptacles configured according to the invention, electrical conductors in the form of wires are thus no longer directly inserted, but rather, electrical conductors in the form of connector parts of an electrical connector, wherein these are usually multipolar plug-in connector systems. The base element of an overvoltage protective arrangement according to the invention and an overvoltage protective arrangement that is equipped with such a base element can thus easily be introduced into the wiring of an existing plant. To this end, only at the corresponding position must the existing cabling be interrupted by intentional opening/separating of the existing system plug-in connector. In between, the base element according to the invention is introduced by having the connector parts be plugged into the corresponding first and second receptacles of the base element and the signal circuit be closed again in this way. A change in the wiring (opening of screw/spring or insulation displacement contacts) does not take place in this case.

It was stated in the introduction that there are several connectors that correspond, for example, to various standards or else are specific to the manufacturer. To avoid that the base element must be configured individually for each type of different connector, it is also provided according to the invention that the first receptacle and the second receptacle are designed for receiving adapter connector parts for electrical connectors. Such an adapter connector part is designed on one connection side in such a way that it can be received by the first receptacle and/or the second receptacle of the base element. From the second connection side, the adapter connector part is then designed in such a way that it can receive the corresponding electrical connector part of the connector system that is actually used in practice. Thus, uniform base elements can be used for various units with various connector systems.

In an especially preferred configuration of the base element, it is provided that the base element has a housing, wherein the first receptacle and the second receptacle are made on opposite sides of the front of the housing, and wherein the housing is designed open on the sides pointing in the extending direction of the support rail. Thus, the housing can be equipped comparatively easily with the corresponding electrical components, i.e., for example, with the electrical support rail contact element and the electrical connecting element for transmitting an electrical signal from the first receptacle to the second receptacle. In this connection, it is provided in another advantageous configuration that the base element has closing elements for closing the open sides of the housing. Thus, in addition, electrical insulation of the inside space of the base element can be designed without giving up the advantage of the simple access to the inside space of the base element.

In another advantageous configuration, it is provided that the first receptacle and the second receptacle are designed to be multipolar, in particular bipolar. Thus, in one base element, multiple signal lines and signal voltages can be provided with an overvoltage protection.

Another preferred configuration of the base element provides that the receptacle of the overvoltage protective element is designed to be multipolar, in particular tripolar. At least the electrical potentials between which an overvoltage is to be located and discharged have to be transferred into the overvoltage protective element. It is therefore at least provided that two electrical potentials are transferred into the overvoltage protective element through a thus at least bipolar receptacle for the overvoltage protective element. It makes sense to design a receptacle to be tripolar if, for example, two signals are to be transmitted through the base element and an overvoltage is to be discharged here onto the grounded support rail.

The base element according to the invention is especially preferably used for insulation protection, i.e., to protect each individual signal wire and the grounding system, in particular the support rail.

The invention also relates overall to an overvoltage protective arrangement, in which the described base element and also the described overvoltage protective element are used. Overall, the invention thus relates to an overvoltage protective arrangement, with at least one base element and with at least one overvoltage protective element, wherein the base element has a support rail receptacle for receiving a support rail carrying an electrical potential, a first receptacle for receiving a first electrical conductor, a second receptacle for receiving a second electrical conductor, and a protective element receptacle for receiving the overvoltage protective element, wherein an electrical connecting element for transmitting an electrical signal from the first receptacle to the second receptacle is produced between the first receptacle and the second receptacle of the base element, wherein in the support rail receptacle, an electrical support rail contact element is designed for making electrical contact with the support rail when the support rail is received by the support rail receptacle, wherein when the overvoltage protective element is received in the protective element receptacle, the electrical connecting element and the electrical support rail contact element make electrical contact at least indirectly by means of corresponding electrical contact elements of the overvoltage protective element (and a low-impedance electrical connection between the electrical contact elements is made in the overvoltage protective element in the case of an overvoltage that occurs between the electrical contact elements for the purpose of discharging the overvoltage), and wherein the first receptacle and the second receptacle are designed for receiving electrical connector parts or adapter connector parts for electrical connector parts.

Everything that was previously stated regarding the base element and the overvoltage protective element also applies for the overvoltage protective arrangement mentioned here.

The distinguishing characteristic of an especially advantageous overvoltage protective arrangement is that multiple base elements are arranged aligned beside one another in the extending direction of the support rail and in that for the first receptacles arranged beside one another and/or for the second receptacles arranged beside one another, a one-piece connector part and/or a one-piece adapter connector part is provided, which can be inserted as a whole into the first receptacles arranged beside one another and/or into the second receptacles arranged beside one another. The connector part or adapter connector part has an advantageous property in that it can be used namely with multiple base elements that are arranged beside one another. As a rule, the connector part or adapter connector part is thus multipolar.

An adapter connector part can thus also receive multipolar connector parts of the type of connector used especially in the installation. Modular overvoltage protective arrangements can thus be constructed with multiple similar base elements; in each case, a one-piece connector part and/or a one-piece adapter connector part is inserted into their first receptacles arranged beside one another and/or into their second receptacles arranged beside one another. When the connector part or adapter connector part is called one-piece, this does not mean that it consists of a single constructive element; it means only that it represents a single, easy-to-use element that can be inserted can be removed.

In a quite especially preferred configuration, five base elements are arranged beside one another and are designed for receiving a ten-polar connector part or adapter connector part.

According to another embodiment, it is provided that the adapter connector part is configured as a plug-in connector on the side facing away from the first receptacle or on the side facing away from the second receptacle, in particular wherein the type of plug-in connector on the side facing away from the first receptacle or on the side facing away from the second receptacle is a different type of plug-in connector than on the side of the adapter connector part facing the first receptacle or on the side of the adapter connector part facing the second receptacle. As a result, the adapter connector part adapts two different types of plug-in connectors to each other. On the side facing the first receptacle or that of the second receptacle, these can then be, for example, specific connections of the manufacturer of the base element or the corresponding overvoltage protective arrangement; on the side facing away from the first receptacle or that of the second receptacle, these can then be different plug-in connectors that are conventional installation plug-in connectors.

In particular, there are several options for further developing and configuring the base element according to the invention for an overvoltage protective arrangement and the corresponding overvoltage protective arrangement as will be apparent from the following detailed description in conjunction with the drawings.

DETAILED DESCRIPTION OF THE INVENTION

Figure 1:
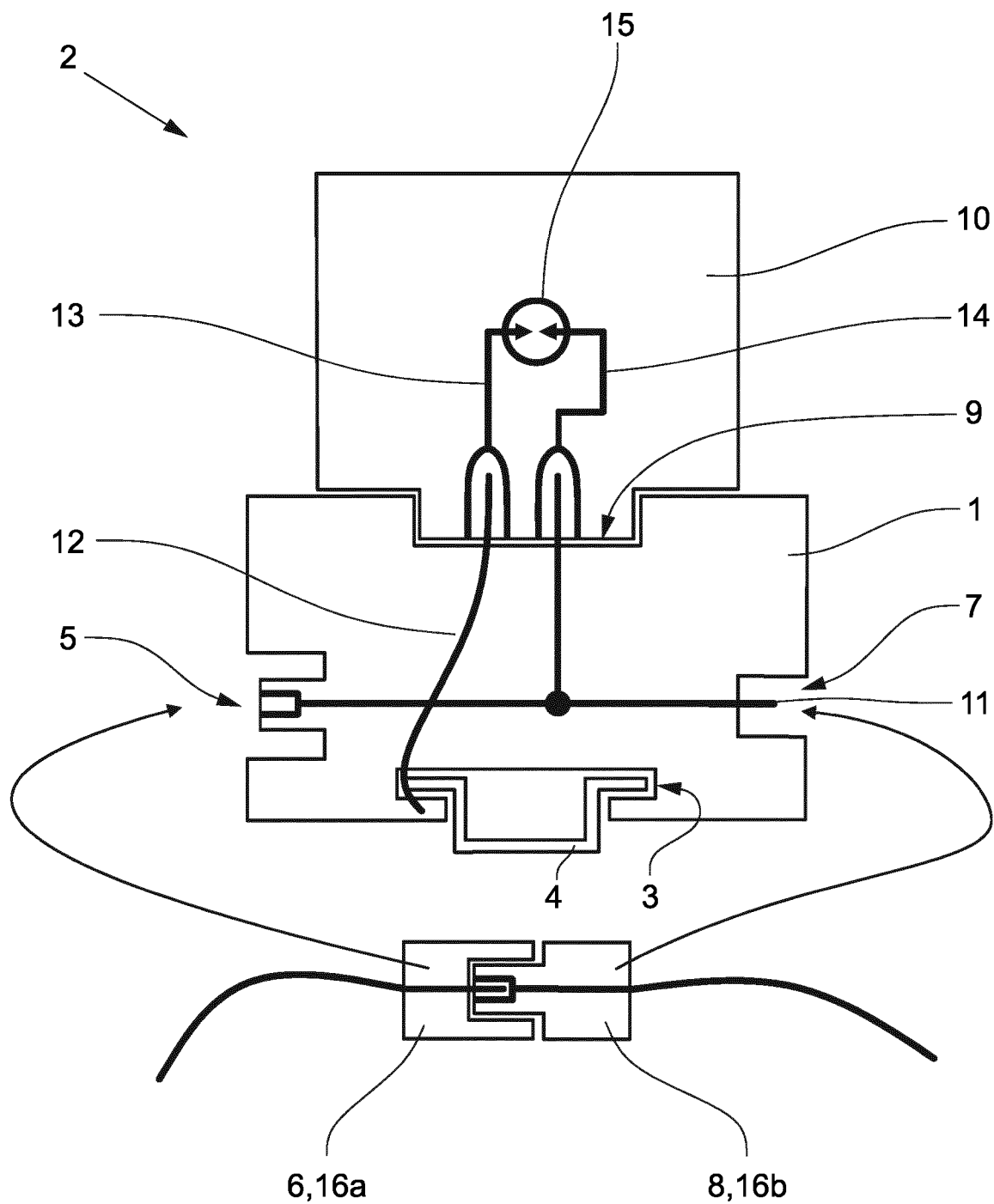
FIG. 1 shows a base element for an at least two-part overvoltage protective arrangement and a corresponding overvoltage protective arrangement in diagrammatic form.

In all of FIGS. 1 to 8, base elements 1 or parts of base elements 1 for a two-part overvoltage protective arrangement 2 are depicted. The base element 1 has a support rail receptacle 3 for receiving a support rail 4 carrying an electrical potential. Each base element 1 comprises a first receptacle 5 for receiving a first electrical conductor 6 and a second receptacle 7 for receiving a second electrical conductor 8.

None of the figures show a base element, as is known from the state of the art. In the state of the art, the first electrical conductor and the second electrical conductor are usually ends—stripped or else not stripped—of a metal wire, wherein the first receptacle and the second receptacle in most cases have spring clamps or insulation displacement terminations. In the case of the depicted base elements 1, as is further explained below, this is achieved in a completely different way.

All base elements 1 have a protective element receptacle 9 for receiving an overvoltage protective element 10.

Figure 7:
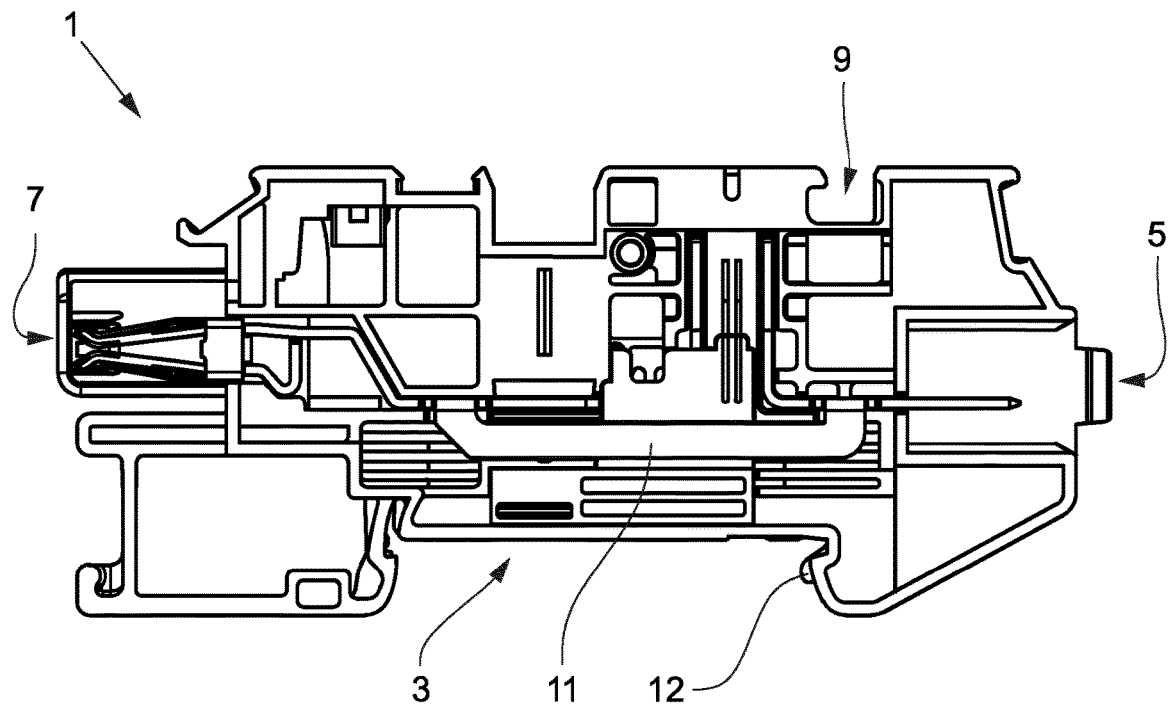
FIG. 7 shows an open side view of a base element.
Figure 8:
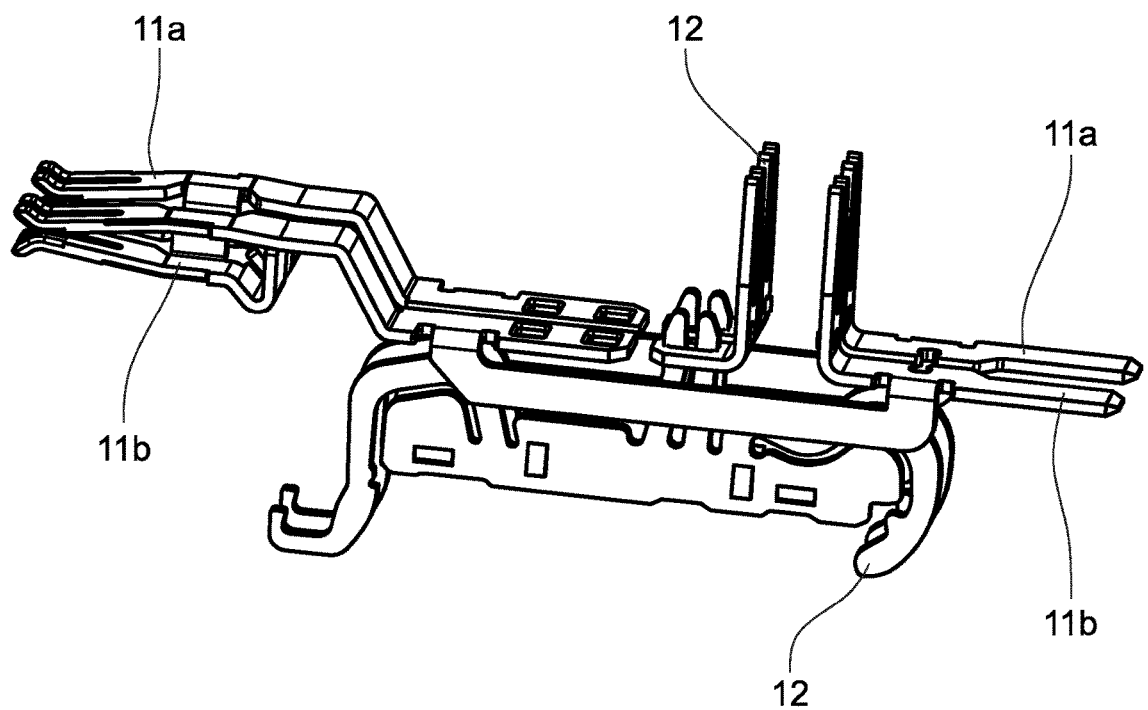
FIG. 8 shows the electrical connecting elements and the electric support rail contact element inside a base element.

FIGS. 1, 7, and 8 show that an electrical connecting element 11, 11a, 11b for transmitting an electrical signal from the first receptacle 5 to the second receptacle 7 is produced between the first receptacle 5 and the second receptacle 7.

In FIGS. 1, 5, 7, and 8, it is evident that in the support rail receptacle 3, an electrical support rail contact element 12 is designed for making electrical contact with the support rail 4 when the support rail 4 is received by the support rail receptacle 3. With the support rail contact element 12, the electrical potential of the support rail 4 can thus be tapped off. In the overvoltage protective element 10, provision is made for discharging a detected overvoltage. To this end, when the overvoltage protective element 10 is received in the protective element receptacle 9, the electrical connecting element 11, 11a, 11b and the electrical support rail contact element 12 make contact by means of corresponding electrical contact elements 13, 14 of the overvoltage protective element 10, which is depicted diagrammatically in FIG. 1. In the overvoltage protective element 10, when an overvoltage occurs between the electrical contact elements 13, 14, a low-impedance electrical connection 15 is made between the electrical contact elements 13, 14, here by a gas discharge valve, and the overvoltage is discharged.

The distinctive feature in the case of the depicted base element 1, and also in the case of the overvoltage protective arrangement 2, is that the first receptacle 5 and the second receptacle 7 are designed for receiving electrical connector parts 16a, 16b or adapter connector parts 17a, 17b for electrical connector parts 16a, 16b. FIG. 1 diagrammatically depicts the application in which the first electrical conductor 6 and the second electrical conductor 8 are present in the form of connector parts 16a, 16b. The connector parts 16a, 16b are in this case corresponding electrical connector parts 16a, 16b with plug-in contacts that interlock in a positive manner. These are thus corresponding male, female electrical connector parts 16a, 16b. The first receptacle 5 is configured in such a way that it can easily receive the electrical connector part 16a, and the second receptacle 7 is configured in such a way that it can easily receive the electrical connector part 16b. It is thus no longer necessary and even no longer desired to bring an electrical conductor 6, 8 in the form of a pure wire into the first receptacle 5 and into the second receptacle 7; rather, the first receptacle 5 and the second receptacle 7 are suitable for receiving connector parts 16a, 16b, as they are present in, for example, plug-in connector systems of electrical installations of, in particular, control and signaling systems.

Figure 2:
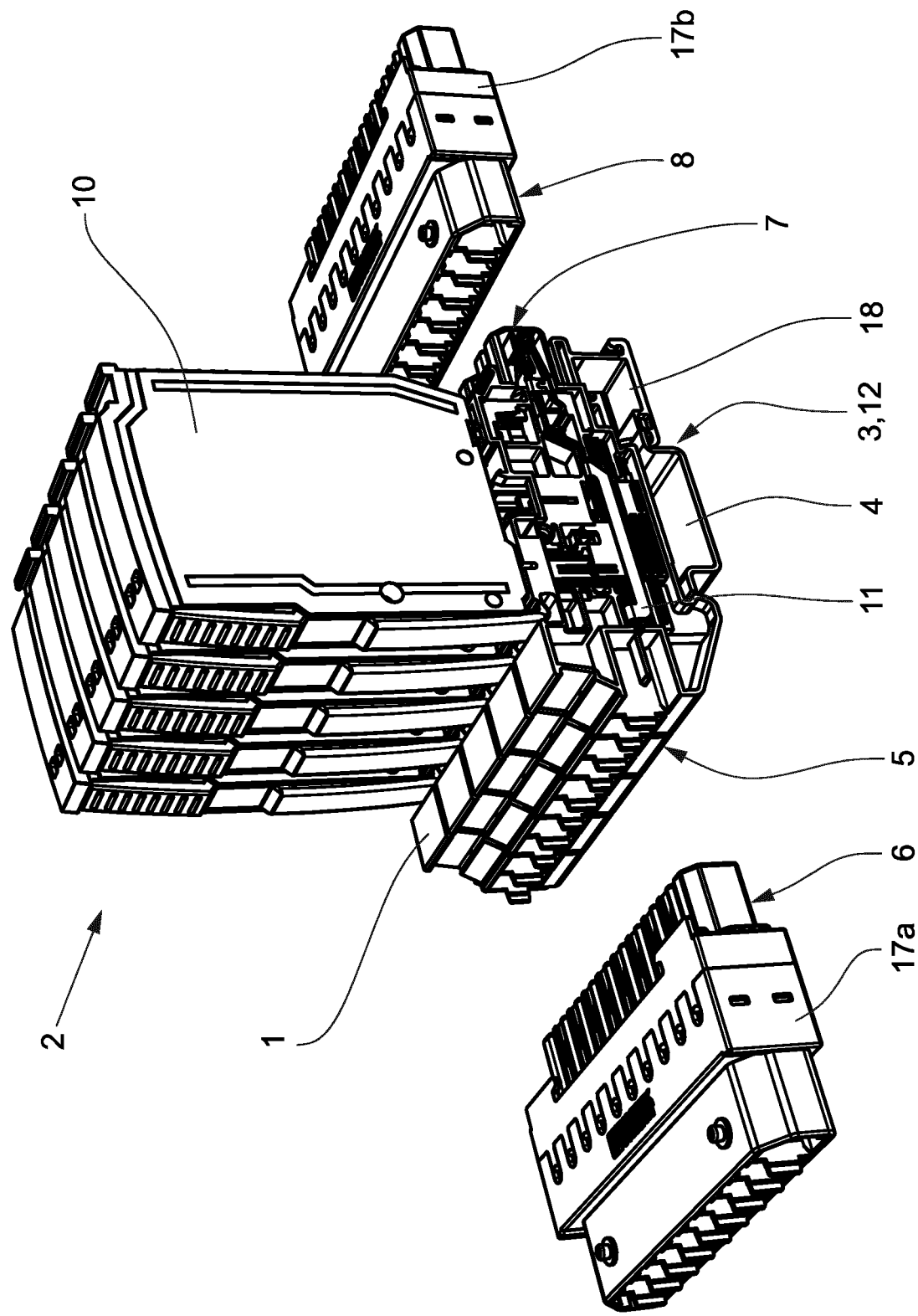
FIG. 2 shows an overvoltage protective arrangement with adapter connector parts according to the invention.
Figure 3:
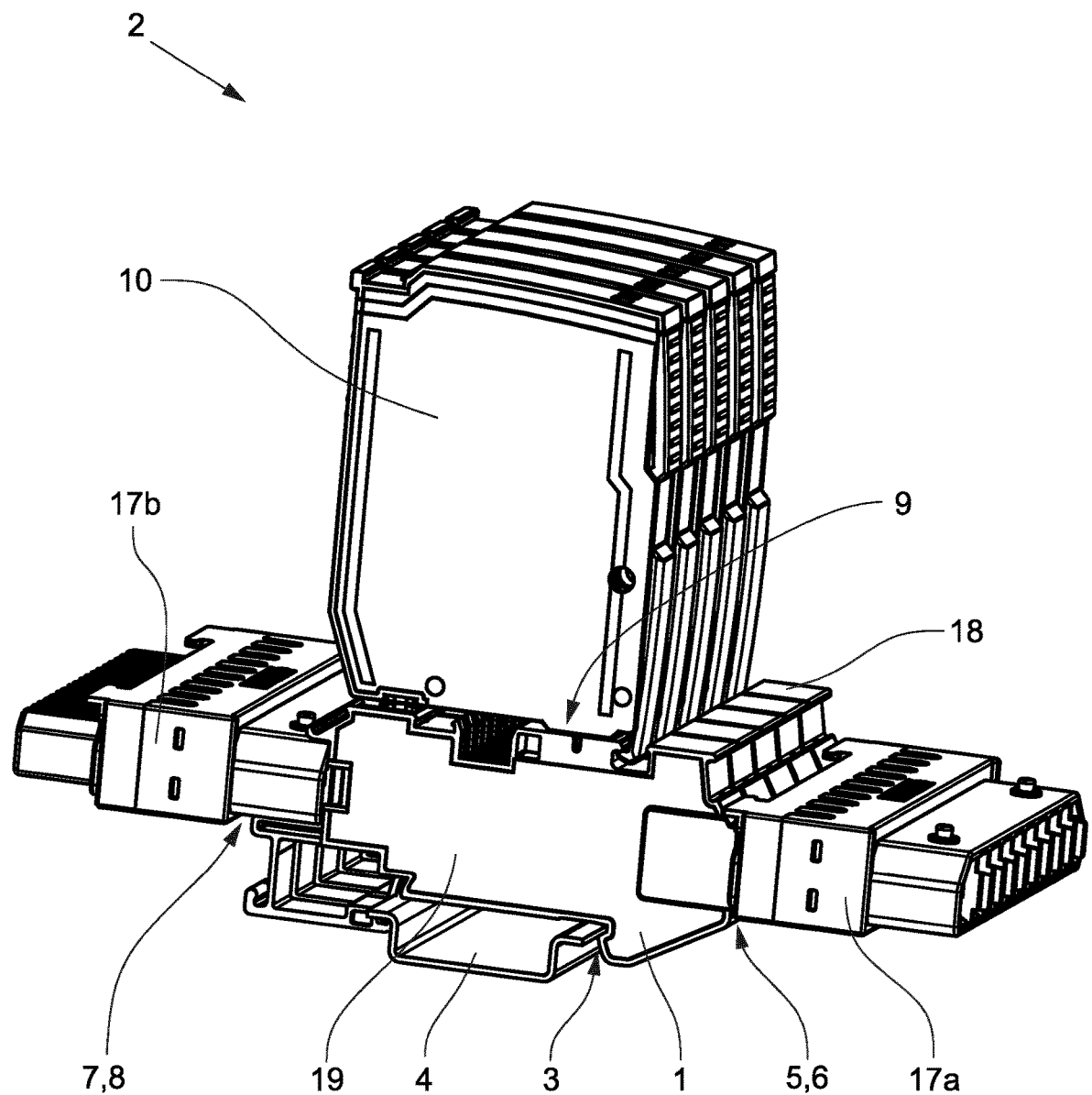
FIG. 3 is perspective view of an overvoltage protective arrangement with plugged-in adapter connector parts according to the invention.

In FIGS. 2 to 7, in each case base elements 1 are depicted, whose first receptacle 5 and second receptacle 7 are designed for receiving adapter connector parts 17a, 17b for electrical connector parts 16a, 16b. The adapter connector parts 17a, 17b are depicted in FIGS. 2 and 3. The adapter connector parts 17a, 17b are, of course, configured on the side facing the first receptacle 5 or on the side facing the second receptacle 7, corresponding to the appropriate first receptacle 5 or the appropriate second receptacle 7. On the side facing away from the first receptacle 5 or on the side facing away from the second receptacle 7, the adapter connector parts 17a, 17b are configured otherwise, however, namely for a type of plug-in connector that had been installed in the plant, into which the overvoltage protective arrangement 2 or the related base element 1 is to be inserted. It is thus very simple to use the same overvoltage protective arrangements 2 or the corresponding base elements 1 for completely different connection situations and types of plug-in connectors without the first receptacle 5 or the second receptacle 7 having to adapt each time to the conditions of the corresponding electrical unit. The adapter connector parts 17a, 17b that are used must only be matched on their side facing the base element 1 to the—manufacturer-specific—first receptacle 5 or second receptacle 7

It can be seen in the figures that the base element 1 has a housing 18. The housing 18 is in this case a housing made of insulation material. The first receptacle 5 and the second receptacle 7 are made on opposite sides of the front of the housing 18. It can be seen in FIGS. 2 and 7 that the housing 18 is designed open on the sides facing in the extending direction of the support rails 4. When dealing with cases where certain sides point in an extending direction, then the surface normal on these corresponding sides is meant. As a result of the housing 18 being open on the corresponding sides, the necessary electrical elements can be brought very easily into the inside space of the housing 18. It can be seen in FIGS. 3, 5, and 6 that the open sides of the housing 18 of the base element 1 have been closed by closing elements 19. It is thus no longer readily possible to touch the electrically conductive parts inside the inside space of the housing 18.

In the case of all embodiments in FIGS. 2 to 7, the first receptacle 5 and the second receptacle 7 are designed to be multipolar, namely bipolar. As a result, it is possible to monitor two signal lines for overvoltage in a base element 1 or in an overvoltage protective arrangement 2 with a base element 1 and an overvoltage protective element 10. Further, it can be seen that the protective element receptacle 9 of the overvoltage protective element 10 in the base element 1 is designed to be multipolar, in this case tripolar. Two poles of the protective element receptacle 9 serve to feed the signals transported via the bipolar first receptacle 5 and the second receptacle 7 to the overvoltage protective element 10, which another pole serves to transfer the electrical potential carried by the support rail 4 into the overvoltage protective element 10. In the depicted embodiments, the first receptacle 5 and the second receptacle 7 have a first division unit, which is 7 mm (about 0.28 in) here in the depicted special configuration. The protective element receptacle 9 of the base element 1 has a second division unit that deviates from the first division unit. In this case, the division unit of the protective element receptacle 9 is 5.15 mm (about 0.2 in).

Figure 4:
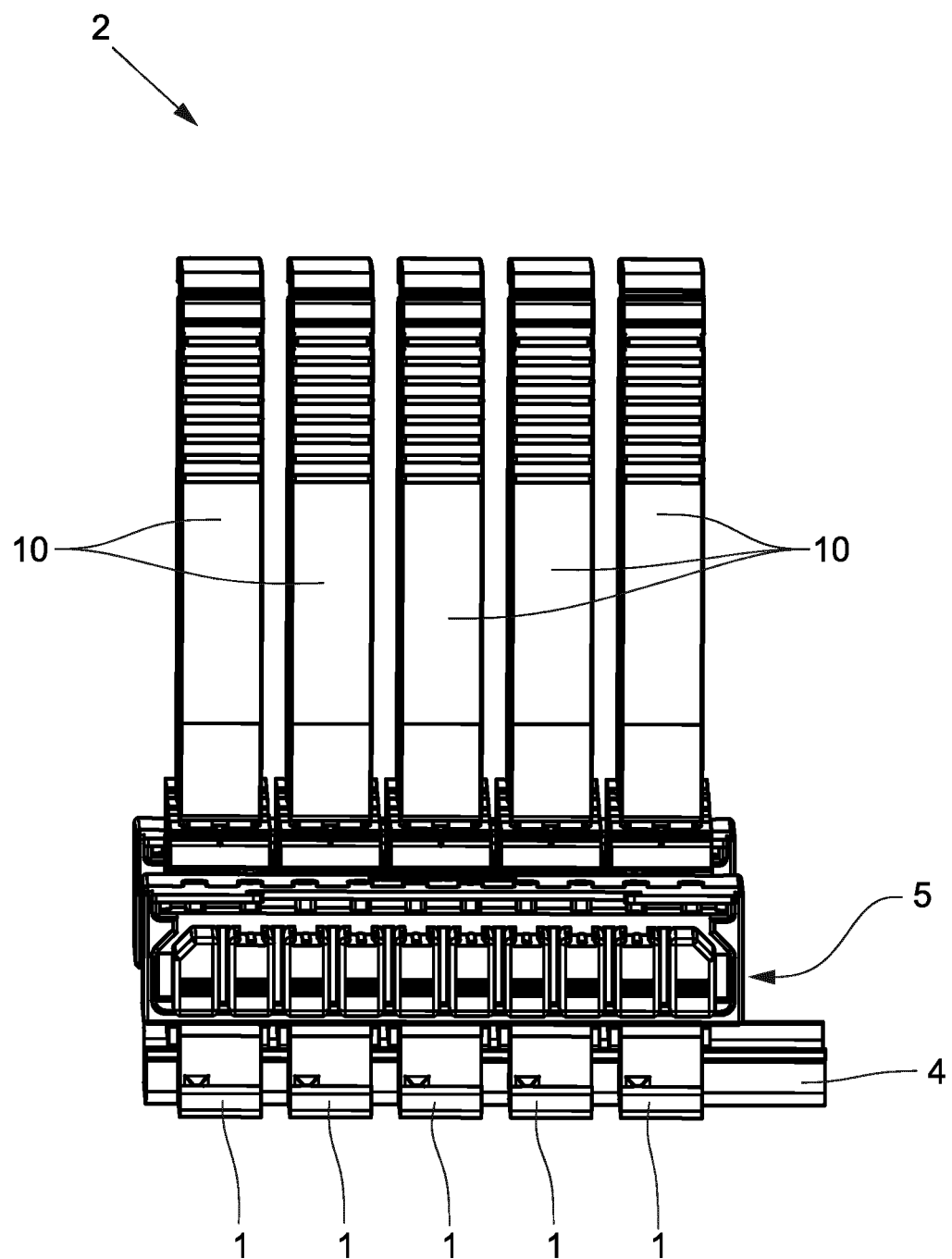
FIG. 4 is a side view of an overvoltage protective arrangement according to the invention.
Figure 5A:
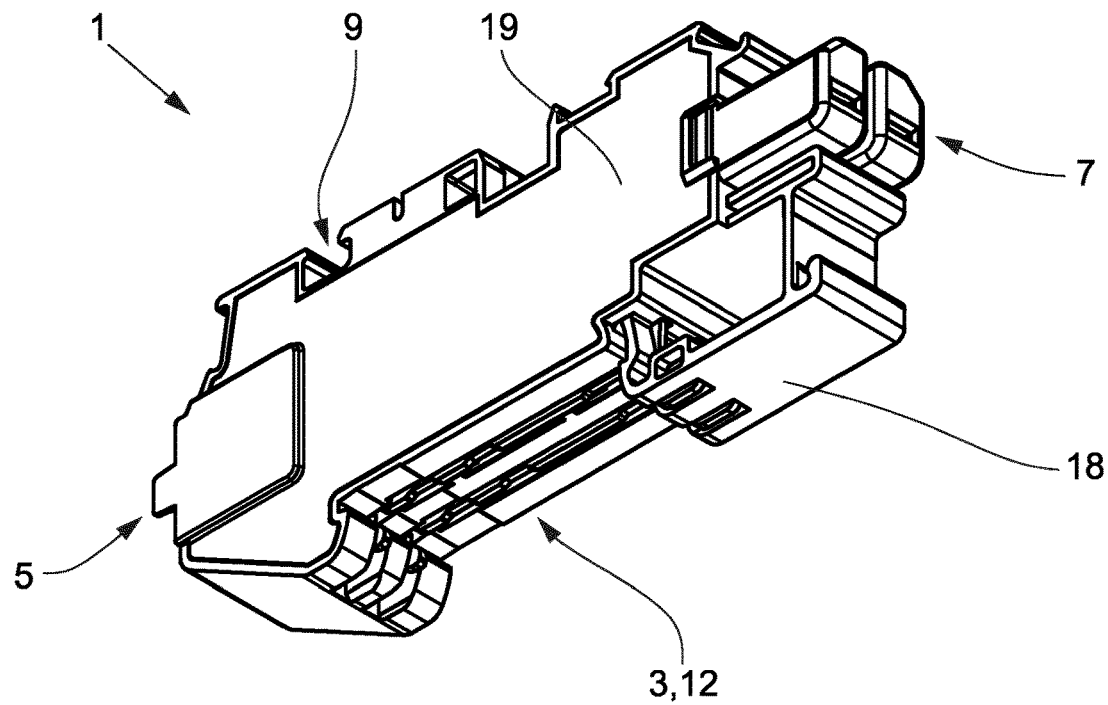
FIGS. 5a, 5b are perspective views of a base element looking toward the support rail receptacle.
Figure 5B:
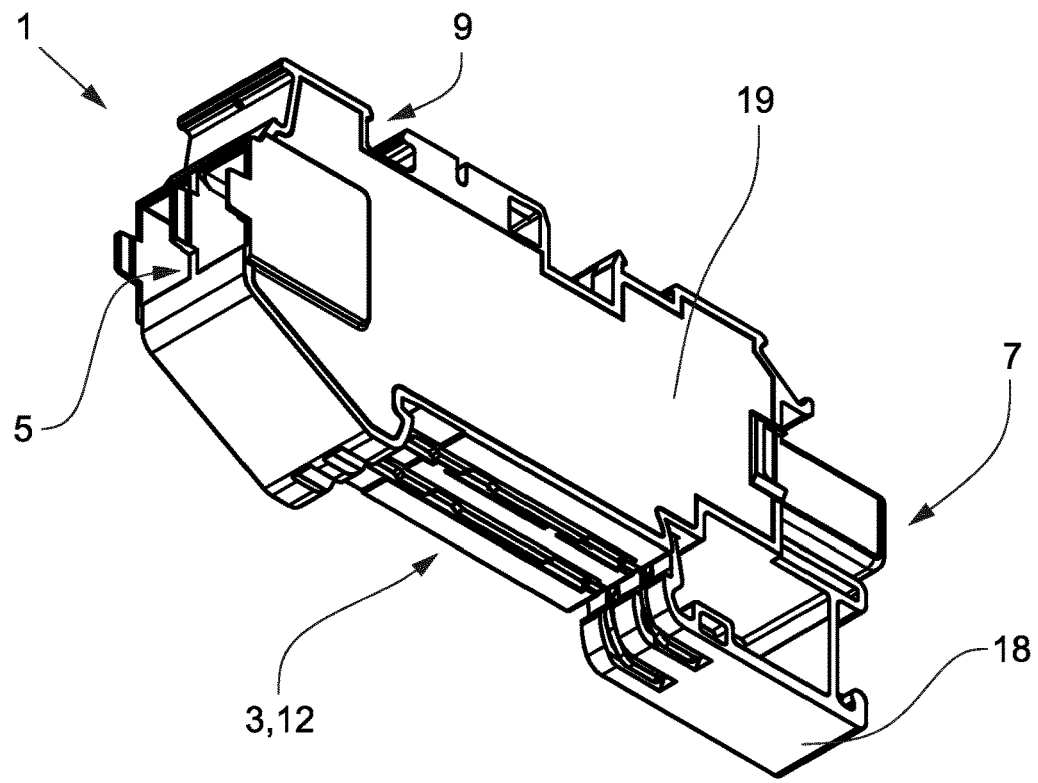
Figure 6A:
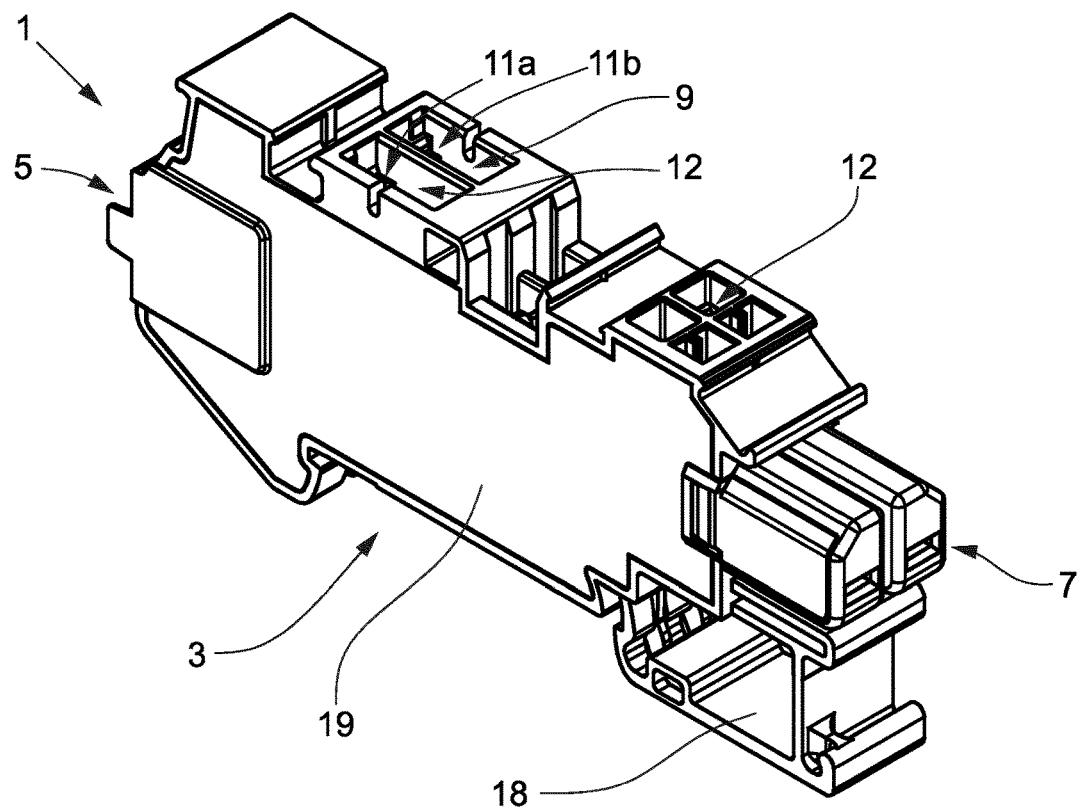
FIGS. 6a, 6b are perspective views of a base element looking toward the protective element receptacle.
Figure 6B:
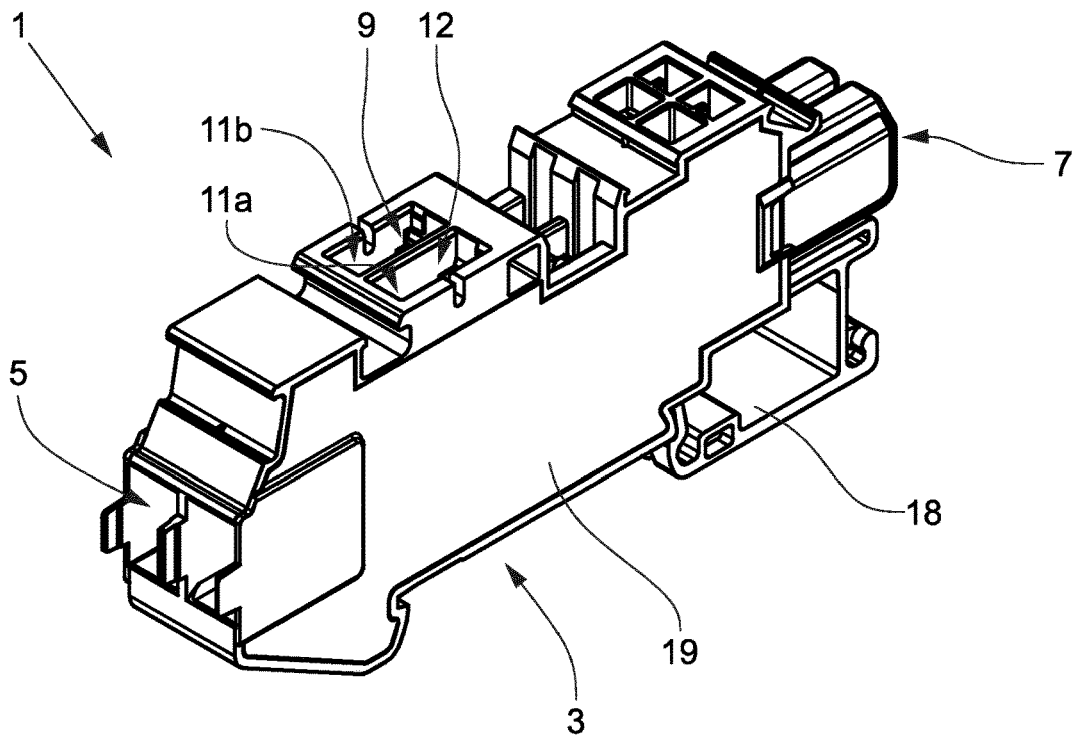

The distinguishing characteristic of the overvoltage protective arrangements 2 depicted in FIGS. 2 to 4 is that multiple base elements 1 are arranged aligned beside one another in the extending direction of the support rail 4. The multiple base elements 1 are thus arranged in parallel beside one another on the support rail 4. Accordingly, the first receptacles 5 of the multiple base elements 1 as well as the multiple second receptacles 7 of the multiple base elements 1 are also arranged beside one another. For these first receptacles 5 arranged beside one another and second receptacles 7 arranged beside one another, a one-piece adapter connector part 17a, 17b is provided, which can be inserted, as a whole, into the first receptacles 5 arranged beside one another and/or into the second receptacles 7 arranged beside one another. The one-piece adapter connector part 17a, 17b can thus be handled as a whole and does not consist of multiple loose parts that are not connected to one another, although it of course has multiple parts, namely, for example, electrical contact elements, which are held in a housing of the adapter connector part 17a, 17b. Because of this modular integration of multiple elementary and individual base elements 1 with the overvoltage protective element 10 that is assigned in each case, it is thus very readily possible to connect very multi-polar connector parts 16a, 16b—by means of corresponding adapter connector parts 17a, 17b.

What is claimed is:

1. A base element for an at least two-part overvoltage protective arrangement, comprising:
   a support rail receptacle for receiving a support rail carrying an electrical potential,
   a first receptacle for receiving a first electrical conductor,
   a second receptacle for receiving a second electrical conductor,
   a protective element receptacle for receiving an overvoltage protective element,
   an electrical connecting element located between the first receptacle and the second receptacle for transmitting an electrical signal from the first receptacle to the second receptacle, and
   an electrical support rail contact element in the support rail receptacle for making electrical contact with the support rail when the support rail is received by the support rail receptacle,
   wherein when the overvoltage protective element is received in the protective element receptacle, the electrical connecting element and the electrical support rail contact element make electrical contact at least indirectly by means of corresponding electrical contact elements of the overvoltage protective element, and a low-impedance electrical connection between the electrical contact elements is made in the overvoltage protective element when an overvoltage occurs between the electrical contact elements for discharging the overvoltage,
   wherein the first receptacle and the second receptacle are configured for receiving electrical connector parts from the first and the second electrical conductor or adapter connector parts for electrical connector parts,
   wherein the first receptacle and the second receptacle are configured for receiving corresponding electrical connector parts from the first and the second electrical conductor with male/female electrical connector parts, and
   wherein the base element has a housing, wherein the first receptacle and the second receptacle are located on opposite sides of a front of the housing, and wherein the housing has open sides facing in a length direction of the support rail.

2. The base element according to claim 1, wherein the base element has closing elements for closing the open sides of the housing.

3. The base element according to claim 1, wherein the first receptacle and the second receptacle are multipolar.

4. The base element according to claim 1, wherein the protective element receptacle is multipolar.

5. The base element according to claim 1, wherein the first receptacle and the second receptacle have a first division unit, and wherein the protective element receptacle has a second division unit, wherein the second division unit is different from the first division unit.

6. An overvoltage protective arrangement, comprising:
at least one base element having a support rail receptacle for receiving a support rail carrying an electrical potential,
at least one overvoltage protective element,
a first receptacle for receiving a first electrical conductor,
a second receptacle for receiving a second electrical conductor,
a protective element receptacle for receiving the overvoltage protective element, and
an electrical connecting element for transmitting an electrical signal from the first receptacle to the second receptacle,
wherein an electrical support rail contact element is provided in the support rail receptacle for making electrical contact with the support rail when the support rail is received by the support rail receptacle,
wherein, the electrical connecting element and the electrical support rail contact element make electrical contact at least indirectly by means of corresponding electrical contact elements of the overvoltage protective element when the overvoltage protective element is received in the protective element receptacle,
wherein a low-impedance electrical connection is produced between the electrical contact elements in the overvoltage protective element when an overvoltage occurs between the electrical contact elements for discharging the overvoltage,
wherein the first receptacle and the second receptacle are configured for receiving electrical connector parts from the first and second electrical conductor or adapter connector parts for electrical connector parts,
wherein the first receptacle and the second receptacle are configured for receiving corresponding electrical connector parts from the first and the second electrical conductor with male/female electrical connector parts, and
wherein the base element has a housing, wherein the first receptacle and the second receptacle are located on opposite sides of a front of the housing, and wherein the housing has open sides facing in a length direction of the support rail.

7. The overvoltage protective arrangement according to claim 6, wherein the first receptacle and the second receptacle are multipolar.

8. The overvoltage protective arrangement according to claim 6, wherein the protective element receptacle is multipolar.

9. The overvoltage protective arrangement according to claim 6, wherein the first receptacle and the second receptacle have a first division unit, wherein the protective element receptacle has a second division unit, and wherein the second division unit is different from the first division unit.

10. The overvoltage protective arrangement according to claim 6, wherein multiple base elements are arranged aligned beside one another in the length direction of the support rail and wherein for at least one of first receptacles arranged beside one another or second receptacles arranged beside one another, a one-piece connector is provided which can be inserted as a whole into the at least one of the first receptacles arranged beside one another or the second receptacles arranged beside one another.

11. The overvoltage protective arrangement according to claim 10, wherein the one-piece connector part is an adapter connector part that is configured as a plug-in connector on a side facing away from the first receptacle or on a side facing away from the second receptacle, and wherein the plug-in connector on the side facing away from the first receptacle or on the side facing away from the second receptacle is a different type of plug-in connector than on the side of the adapter connector part facing the first receptacle or on the side of the adapter connector part facing the second receptacle.

12. The base element according to claim 1, wherein:
the first and the second electrical conductor comprise first and second electrical lines that are external to the overvoltage protective arrangement; and
the electrical connector parts comprise a male electrical connector part connected to the first external electrical line and a female electrical connector part connected to the first external electrical line.

13. The base element according to claim 12, wherein:
the male electrical connector part and the female electrical connector part comprise respective plug-in connector parts that interlock with one another in a positive manner;
the first receptacle is configured to receive the plug-in connector part of the male electrical connector part; and
the second receptacle is configured to receive the plug-in connector part of the female electrical connector part.

* * * * *